Figure 1A:
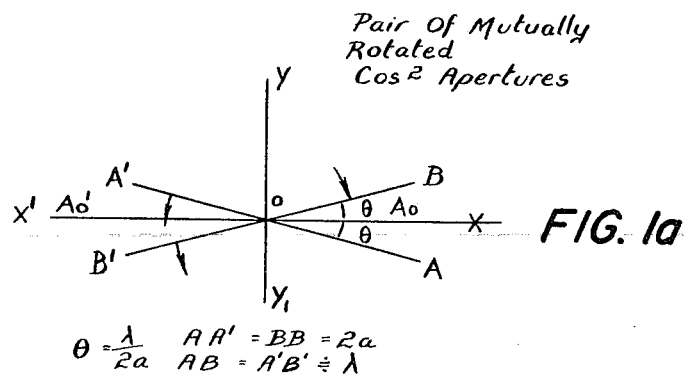

United States Patent
Willoughby

[11] 3,716,862
[45] Feb. 13, 1973

[54] GENERATION OF NAVIGATING PLANES FOR AIRCRAFT LANDING UTILIZING PARABOLIC CHEESE AERIAL

[75] Inventor: Eric O. Willoughby, Adelaide, Australia

[73] Assignee: The University of Adelaide, Adelaide, Australia

[22] Filed: Feb. 24, 1970

[21] Appl. No.: 13,470

[30] Foreign Application Priority Data

Feb. 24, 1969 Australia..............................50970/69

[52] U.S. Cl.................343/108 R, 343/780, 343/840
[51] Int. Cl..................................................G01s 1/14
[58] Field of Search..........343/108 R, 840, 780, 786

[56] References Cited

UNITED STATES PATENTS

| | | | |
|---|---|---|---|
| 3,196,444 | 7/1965 | Shinn | 343/840 X |
| 3,434,144 | 3/1969 | Cooper | 343/108 |
| 3,176,301 | 3/1965 | Wellons et al. | 343/840 X |

*Primary Examiner*—Benjamin R. Padgett
*Attorney*—Waters, Roditi, Schwartz & Nissen

[57] ABSTRACT

An aerial system for aircraft instrument landing wherein a symmetrical parabolic cheese aerial fed from two excitation centers symmetrical about the focus produces aperture illuminations with variations substantially of the form $$C \cos \pi x/a \cos^2 \pi x/2a$$

and $D \sin \pi x/a \cos^2 \pi x/2a$
simultaneously in the radiating aperture, wherein $2a$ is the length and $x$ is the distance from its center and $C$ and $D$ are constant factors measured in terms of illumination intensity per unit length of aperture, thereby producing the equivalent of two identical radiation patterns from the same radiation center mutually rotated with respect to each other which are added and subtracted to produce the navigation information, and with their excitation systems in the same plane.

8 Claims, 14 Drawing Figures

Localiser Plane Generation

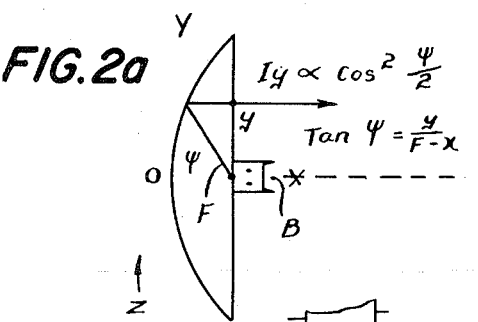
FIG.2a
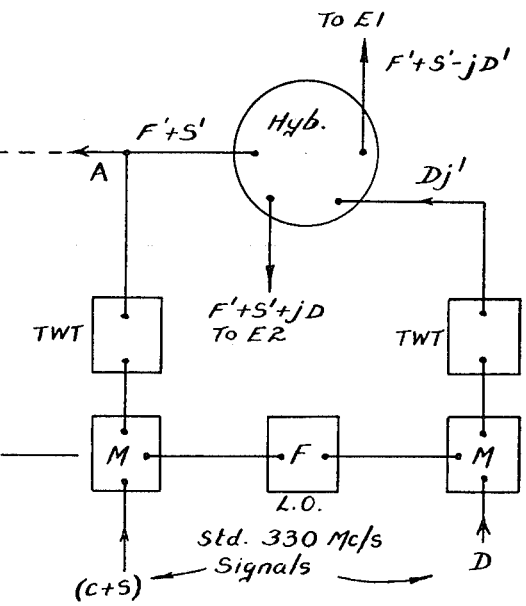
FIG.2c
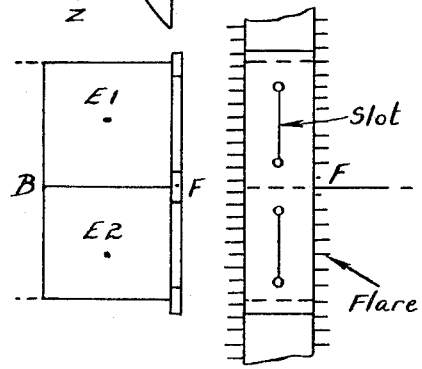
FIG. 2b
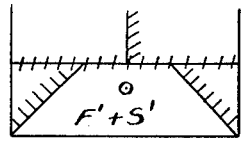
FIG.2d
Note:- B Has Negligible Effect On Navigating Plane
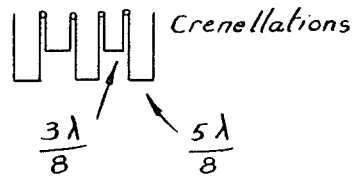
FIG. 3a
FIG. 3b

RECEIVING ANTENNA

Perpendicular Glide Path
And Localiser Polarisations

Parallel H.P. E. fields
For G.P. And Location

BALANCED HYBRID DETECTOR UNIT

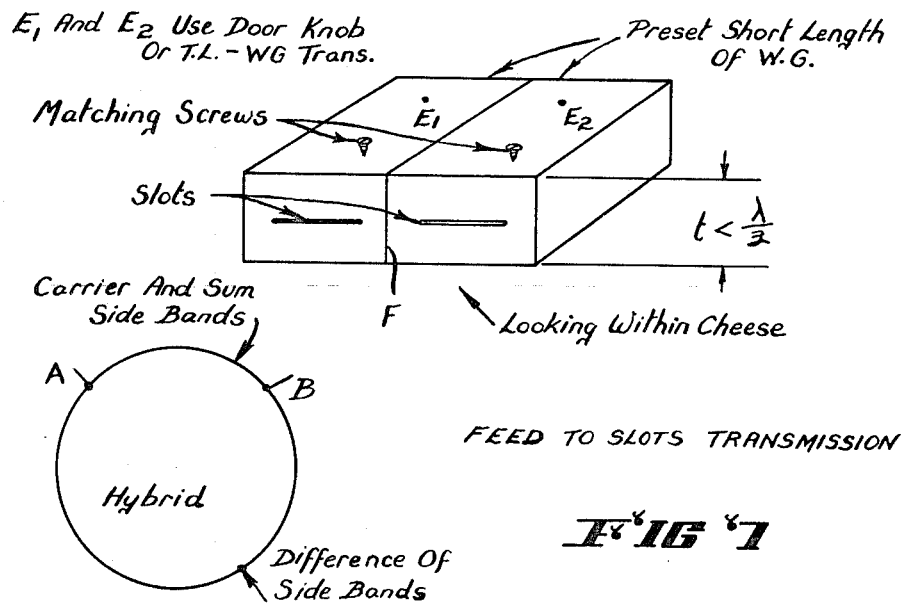
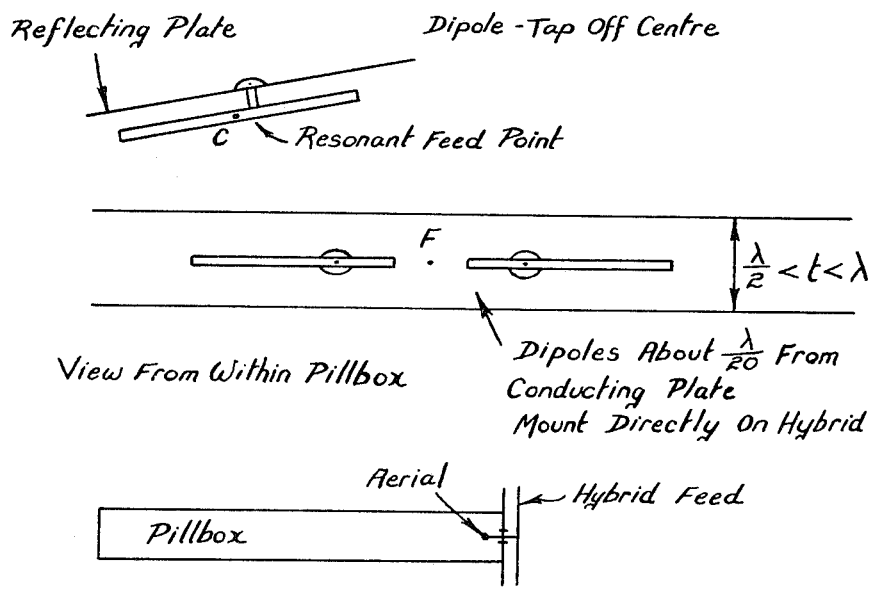

GENERATION OF NAVIGATING PLANES FOR AIRCRAFT LANDING UTILIZING PARABOLIC CHEESE AERIAL

This invention relates to a system of generation of navigating planes for aircraft landing.

Problems which exist when an aircraft approaches a landing strip include being able to guide the aircraft to the landing strip both with respect to correct alignment of the aircraft with the landing strip and also with respect to the glide path which the aircraft follows in approaching the landing strip.

Thus to guide an aircraft to a strip when poor visibility exists and where reliance on instrumentation becomes important, two principle factors must be borne in mind. Firstly the aircraft must be able to approach the runway along the correct path and secondly the aircraft must be able to descend at a precise rate along a glide path which will bring it on to the approach end of the runway to ensure that it has the full use of the runway for deceleration.

Various systems have been proposed heretofore including a system in which two cheeses were used, placed one on the other but slightly differently orientated, but difficulties exist including scatter between the two cheeses, reflection of the signal from nearby objects, adverse atmospheric conditions with signal bending and the like and therefore the approach can be rendered extremely difficult. This condition can be worsened when inclement weather conditions exist where the aerials are subject to interference both mechanically and electrically, such as by the existence of snow, which can result in poor or incorrect signals.

An object of the present invention is to provide a method and means of guidance which will produce a true glide plane, a further object being to produce a demodulating signal which exactly covers the first pair of navigating side lobes. A still further object is to produce so simple and compact an aerial system that it is mechanically rigid and free from ageing of feed lines and components, and to reduce maintenance to a minimum and to maintain good operating conditions under adverse weather.

The objects of the present invention are achieved by using a symmetrical parabolic cheese aerial fed from two excitation centers symmetrical about the focus thereof to produce aperture illuminations producing the equivalent of two identical radiation patterns from the same radiation center mutually rotated with respect to each other which are added and subtracted to produce the navigation information, and with their excitation systems in the same plane.

The aerial system excitation centers may be colinear slot apertures in a conducting plate symmetrical about the focus, and the electrical fields are directed across the width of the apertures.

Figure 1B:
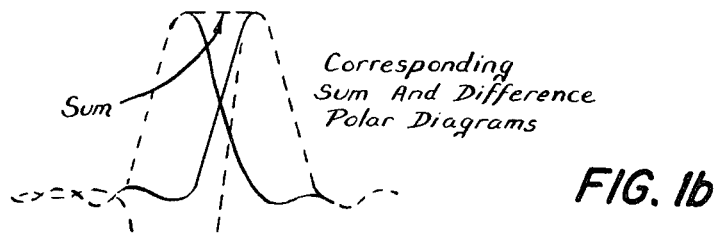
Figure 1C:
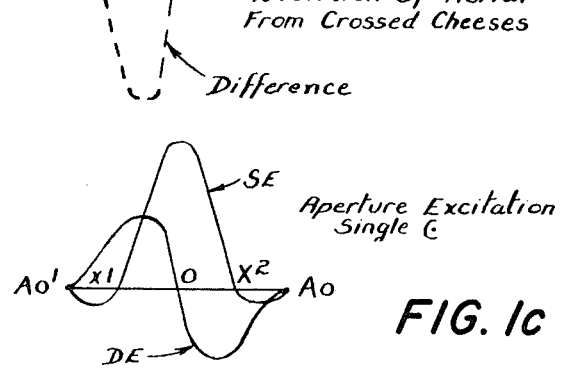

The following description will show how the desired objects are achieved, the description having reference to the accompanying drawings in which:

FIGS. 1a–1c show how the apertures are arranged, showing also the polar diagrams, FIGS. 2a–2d show schematically the aerial construction and energization, FIGS. 3a and 3b show shows a cheese and the method of achieving the local and long range navigating planes.

Figure 4:
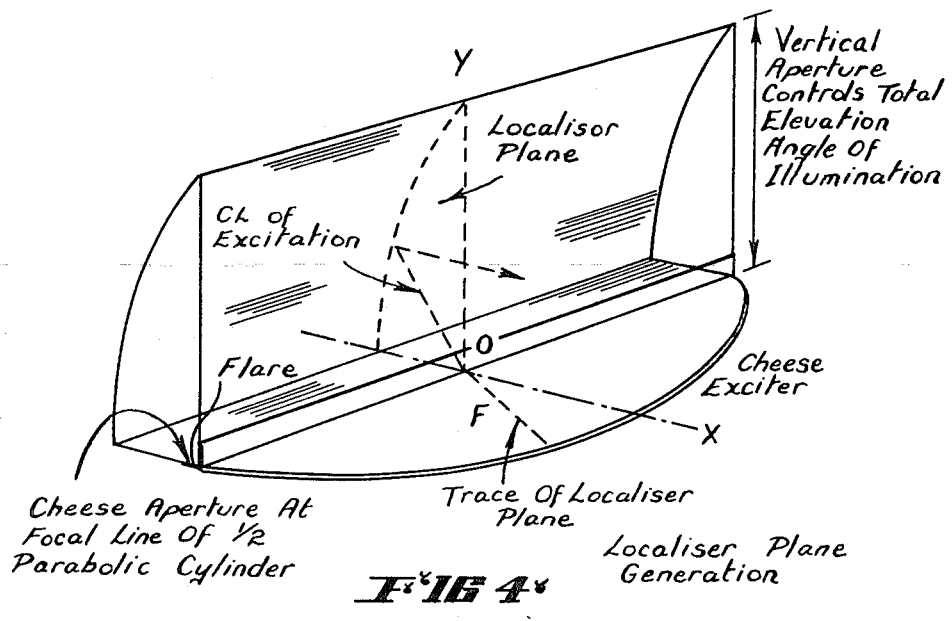
Figure 5:
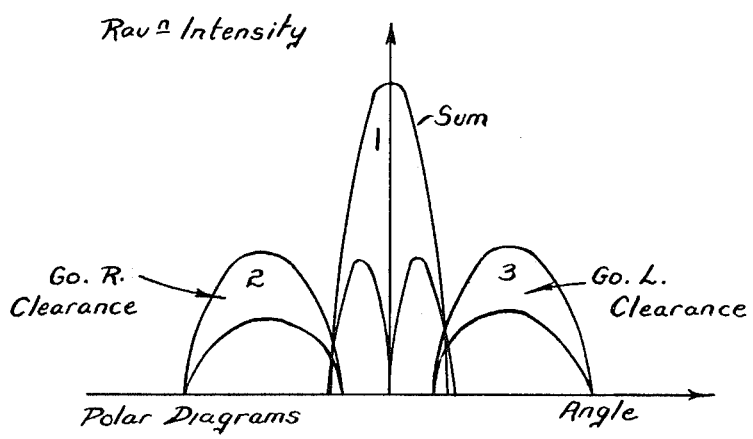
Figure 5:
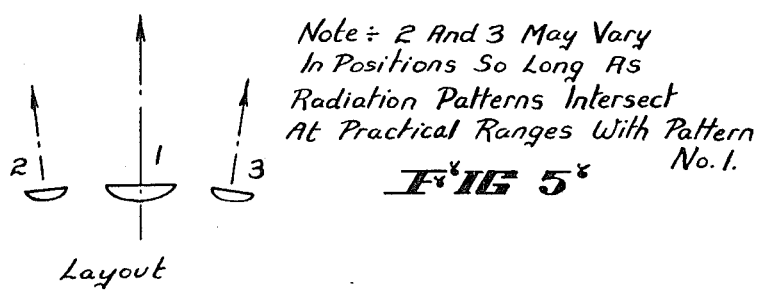
Figure 6:
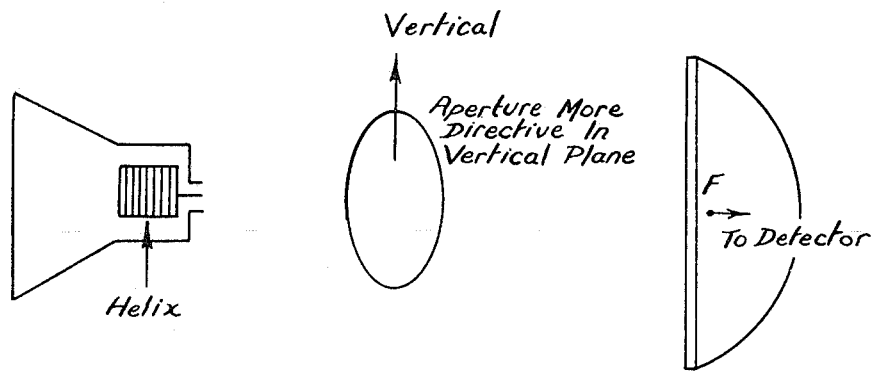
Figure 6:
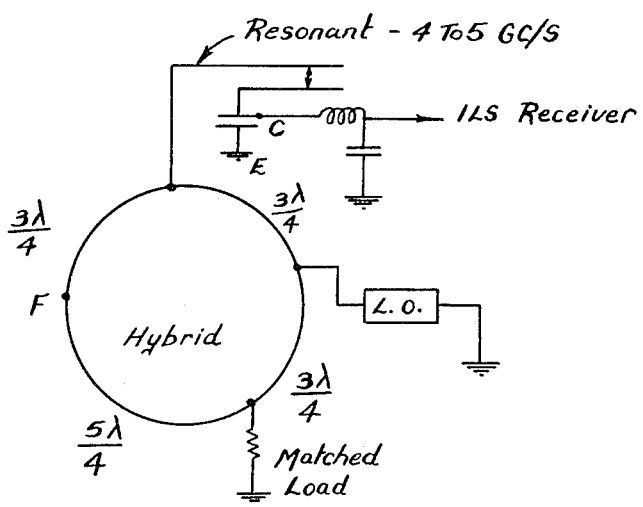

FIG. 4 diagrammatically shows the cheese aerial acting as a line source to a half parabolic cylinder and thereby generating a vertical localizer plane of restricted vertical angular speed, FIG. 5 shows clearance aerials to increase angular coverage, FIG. 6 shows two alternative receiving aerial systems with appropriate mixer circuits, and FIGS. 7 and 8 show excitation of transmitting aerials.

From a pair of crossed (cosine)$^2$ line aperture distributions with a common center, relatively simple excitation of a single parabolic cheese aerial is derived which can generate a localizer or glide plane surface in its short axis plane of symmetry and the appropriate sum pattern to demodulate it. Operating at about 4,000 to 5,000 Mc it forms an excellent landing aerial to touch down and for regeneration of glide path en route. High stability is achieved due to a very compact and simple excitation system.

By using a directive cheese aerial of modest size and travelling wave tube amplifier in the aircraft operating ranges of the present 330 Mc glide path system can be doubled. Further arranging a similar aerial with its navigating plane vertical may be used to regenerate the localizer plane en route.

EVOLUTION AND DESCRIPTION

As described by Kiely, (Experimental Wireless Jan. 1951) the cosine$^2$ line source is readily generated to good approximation by a quarter parabolic pill box.

Referring to FIGS. 1a–1c this design was initially made using a pair of crossed cosine$^2$ excitations whose sum and difference radiation patterns about their common center form a nearly ideal navigation system of demodulating signal S and navigating signal D (see FIG. 1b).

It has recently been shown that two symmetrical crossed quarter pill boxes, each $\lambda/6$ thick, can work into a common flare. This resulted in a scatter signal from active to inactive pill box of 24DB down. The system is however difficult to fabricate and suffers from pattern deterioration due to rescatter of energy fed from one cheese into the other through their apertures and the feed system described hereinafter was evolved to overcome these problems.

A recent study "The effect of tapered illumination on Fresnel zone patterns" (I.R.E. of Australia, Davis and Willoughby, Nov. 1967), made clear the great stability of cosine$^2$ distribution in the near field pattern region and its slow rate of change from aperture distribution to Fraunhoffer zone pattern. No doubt this is due to its first order similarity to the error function whose excitation diagram and Fraunhoffer pattern are the same.

Hence in FIG. 1a it was concluded that a single cheese aperture containing the distribution of the vector mean sum and difference of the two excitations inclined at an angle $\pm \lambda/2a$ in their axis of symmetry would produce the desired results.

FIG. 1c shows the illumination required in the aperture of the cheese to produce the desired sum and difference patterns corresponding to inclined radiation patterns of the form of FIG. 1b.

Referring to FIG. 1c it is simple to establish that:

$$S_E = C \cos \Omega t \cos (\pi x/a) \cos^2 (\pi x/2a)$$

$$= E\ 32\ C \sin \Omega t \sin (\pi x/a) \cos^2 (\pi x/2a)$$

at the illumination levels required in the aperture as indicated in FIG. 1c.

Fortunately a relatively simple exciter system can produce this aperture illumination since the maxima of the difference pattern $D_E$ are the same as the zeros $Z_1$ and $X_2$ of the sum pattern $S_E$.

Using $\tan \Psi = {}^Y\!/f{-}x$ as in FIG. 2a this determines the desired polar diagram of the focal exciter unit of FIG. 2

For $Y = F$, $\Psi = \text{artan}\ 4/3 = 53.2°$

In FIGS. 2b and 2c, a pair of $\mu/2$ resonant slots terminating short lengths of short circuited wave guides are separated by $0.63\mu$ and excited by signals $$F' + S' + jD' \text{ and } F' + S' - jD'$$

generated by the circuit of FIG. 2d.

C + S, and D represent the carrier plus sum of 150 and 90 cycle side bands, and difference of the same side bands as used in the current 330 Mc/s glide path systems.

F is a crystal controlled stage multiplied up to a suitable S band frequency and used with mixer stages M to translate the 330 Mc/s glidepath signals to navigating signals of the order of 4,000 Mc/s.

These are passed through a hybrid to generate the signals $F' + S' + jD'$ and $F' + S' - jD'$ which equally excite the two slot aerials with balanced excitation on carrier plus sum of side bands and perfectly assymetrical excitation on the navigation difference side bands. Note $j$ indicates quadrature phasing is required in the $jD$ channel.

Note particularly that both the sum channels pass through the same mixer and travelling wave tube and the side band difference channels pass together through another similar channel. This ensures the simple reliable functioning common on 110 Mc/s and 330 Mc/s instrument landing equipment is retained at 4,000 to 5,000 Mc/s operation.

APERTURE BLOCKING

This is clearly of major significance on the sum pattern, but the difference pattern which is of paramount importance in navigation is assymetrical and of zero net excitation at the focal center. This ensures the effect of aperture blocking on the navigation signal is negligible. This is particularly the case for angles near the null plane which is unaffected and any change will be a second order narrowing to the navigation beams.

In regard to the sum pattern considerable changes can occur without seriously altering the null path as determined by demodulation as aperture blocking causes narrowing of the main beam and increase of the side lobes. A bleeding of the $F' + S'$ channel of FIG. 2c at A fed into the secondary aerial unit B mounted onto the rear end of the exciter unit can correct aperture blocking for the important small angles near the aperture plan. Appropriate amplitude and phase control will be required and when the first nulls in the radiated sum pattern and those of the difference patterns coincide we have evidence of correct adjustment.

Since glide path equipment operates at low angles to the horizon small incidental high angle scattering from the correcting circuit will be scattered at high angles before reaching the flight path.

CLEARANCE AERIALS (refer to FIG. 5)

Note that high angle glide path operation and the outer angular regions of localizer operation can be dealt with for non-coincidence of the first minima of sum and difference patterns by clearance radiation from outer aerials 2 and 3 mounted on either side of the main beam 1 which dominate outer lower level signals of the central navigation by capture effect. This would result in radiation of $F' + S'$ from B then being unnecessary.

These clearance aerials 2 and 3 can be placed anywhere for convenient mounting so long as the clearance beams overlap the main navigation beams at all operating positions of the aircraft receiver.

CURVE FITTING TO THE DESIRED EXCITATION CHARACTERISTIC (See FIG. 1c).

This can be carried out remarkably well due to three factors.

a. The $\cos^2 \Psi/2$ factor in the variation of illumination due to variation of the distance to the focus.

For F the focus in the aperture plane this varies from 0.5 at the edge of the aperture to 1 at the center and proves both suitable in magnitude and convenient mechanically.

b. Because $\sin (\pi/2 \cos \theta)$ factor which is characteristic of the pattern for planes through the length of the slot.

c. The phase angles between the sum and difference vectors due to their distance from the mean line through the intersection point i.e. $A_oA_o'$ of FIG. 1a.

SLOT MATCHING AND MICROWAVE CIRCUITRY (Refer FIGS. 2a–2c and 7)

The vertical screw stubs that match the wave guides behind the slot radiators are easily adjusted and can provide a suitable loading to correctly proportioned cavity.

The wave guide cavity length is initially adjustable but once near optimum can be fixed. The thickness of the pill box of 0.45 λ ensures that a suitable transition from T.W.T. concentric transmission line to wave guide can be made, hence a non-critical balance is readily achieved with careful manufacture and preliminary testing to fix the geometry. It is desirable that any preliminary adjustments are finally soldered.

The circuit of this aerial and exciter system are such that it is possible to mount the hybrid on the base of the exciter and use extremely short leads from the hybrid to the aerials.

In fact it may be possible to directly mount the concentric tube plugs $E_1$ and $E_2$ on a strip line hybrid, an integrated solution which with rigid construction and welding up of initial adjustments could maintain the null plane indefinitely. The only supervisory controls would operate to shut the system down on electrical failure of either or both navigation side band channels and carrier plus sum channel.

It is clearly possible to avoid any deterioration due to ageing in transmission lines with so simple and short a feed system as compared to a multiple feed aerial with long feed lines, and by good mechanical construction make a system that maintains its null plane without monitoring of the equisignal path. Although due to the very high reliability required some such follow up may be provided to cope with severe storms clearly it is possible to achieve a very high degree of reliability with a minimum of maintenance.

RECEIVER (refer to FIG. 6)

The receiver must not radiate the local oscillator signal so a balanced mixer system is essential and due to the convenience of localizer and glide path transmissions being received simultaneously in one microwave input system a wide band travelling wave pre-amplifier is most desirable and it is the most robust input circuit to cope with spurious radar signals which might otherwise burn out the mixer diode.

Note that the local oscillator signal is common to both systems and needs to be of a level of about 1 volt for efficient mixing and need only have a frequency stability of the order of ± 10 Kc from the correct value to produce the 110 and 330 Mc/s signals of localizer and glide path as the receivers will capture these signals into the appropriate channels.

The above system feeds its output directly into the present instrument landing system receivers clearly however if the 5,000 Mc/s system takes over a much narrower frequency spread could prove more convenient as then both channels could be passed through a common video IF strip.

RELIABILITY

The key to reliability of this navigating system is its hybrid feed system and perfect symmetry and a symmetry of a single pair of feed points. Thereby with correct manufacture it is impossible for relative drift to occur and thereby shift the navigation planes.

Further it is possible by hybrid addition of transmitters in parallel and operating with carrier frequencies within capture effect of the receiver to ensure a much greater degree of reliability. The amplitude of the transmitter outputs are graded so that the greatest output dominates navigation in normal operation or on the failure of one of a number of parallel transmissions.

Thereby the reliability of navigation path generation is greatly enhanced for if the failure rate of a transmitter is once in "$p$" hours that of a pair becomes one $p^2$ hours and so on.

DIRECTIVITY IN AZIMUTH

FIG. 3a shows a flare suited to landing to touch down the short left hand side of the flare gives the beam spread necessary to cope with the near glide path on the left hand side of the aerial, and the long flare gives a strong lobe of the radiation pattern to serve distant sections of the glide path. FIG. 3b shows crenellations to reduce reflections due to the edges of the flare. Other reflector systems are possible such as using the output from the cheese as a focal line source for a parabolic cylinder, but FIG. 3a is a relatively simple solution to the aerial on the aerodrome.

EFFECT OF MICROWAVE DEVELOPMENTS ON RANGE OF OPERATION AT 4,000 Mc/s.

The fact that travelling wave tubes of 100 Watts output are available for power output stages of transmitters on 4,000 Mc/s and that low level travelling wave tube amplifiers and hot cathode mixer diodes are available with low noise factors of 6 – 8 DB make it now possible to extend the glide path indication to 16 – 20 miles, with the transmitter aerial of the type shown and a modest cheese aerial of 12 × 1½ inches aperture on the aircraft.

The overall system loss due to the 1 in 12 reduction of wavelength compared to a conventional 330 Mc/s system is readily shown to be reduced from 21.5 DB to a loss of the order of 6 DB taking into account both transmitter and aerial receiver gains and is amply compensated when long ranges are required by a travelling wave tube pre-amplifier system. Further the directivity of the vertical aperture cheese aerial gives valuable discrimination against up scatter from the ground to the aircraft. The 4,000 Mc/s system can be arranged on detection for its output to operate into the 330 Mc/s standard glide path system and work in conjunction with it automatically by capture effect.

What I claim is:

1. An aerial system comprising a symmetrical parabolic cheese aerial having a focus, a hybrid network, and two excitation centers symmetrical about the focus to produce aperture illuminations with variations substantially of the form $$C \cos (\pi x/a) \cos^2 (\pi x/2a)$$

$$\text{and } D \sin (\pi x/a) \cos^2 (\pi x/2a)$$

simultaneously in the radiating aperture, wherein $2a$ is the length and $x$ is the distance from its center and $C$ and $D$ are constant factors in terms of illumination intensity per unit length of aperture, said centers feeding said aerial thereby producing the equivalent of two identical radiation patterns from the same radiation center mutually rotated with respect to each other which are added and subtracted to produce the navigation information, and with their excitation systems in the same plane, the excitation being produced by the sum and differences of carrier and navigation side bands passed through said hybrid network and used to define a navigating plane.

2. An aerial system as in claim 1 wherein the excitation centers are colinear slot radiators in a conducting plate and are symmetrical about the focus, and the electrical fields are directed across the width of the apertures.

3. An aerial system as in claim 1 wherein the excitation centers are collinear dipole radiators spaced close to a reflecting plate and symmetrical about the focus, whereby the resulting electrical fields are directed parallel to the length of the aperture, said aperture exceeding λ/2 in width but preferably less than λ.

4. An aerial system as in claim 1 arranged to produce aperture distributions of the form $$C \cos(\pi x/a) f(\pi x/2a)$$

$$D \sin(\pi x/a) f(\pi x/2a)$$

where $f(\pi x/2a)$ represents an aperture distribution which when present in an aperture of length $2a$ results in low side lobes.

5. An aerial system according to claim 1 wherein the balanced aerial system has its angular range extended by radiating aerial systems covering partial angles overlapping the outer low levels of the main navigation beam of the central aerial system and extending to cover the desired total angular range and both fully modulated for go left and for go right signals to direct an aircraft or ship onto the central navigation bands and operating on carrier frequencies within the capture range of the navigating receiver.

6. An aerial system as in claim 1 wherein the excitation is at least duplicated by standby transmitters all operating at frequencies within the capture range of the receiver but so graded in amplitude that in normal operation or in the event of the failure of any one or more of the transmitters one transmission will dominate reception and ensure safe navigation.

7. An aerial system according to claim 1 wherein there is a blocking area behind the focus which supports a further radiating aperture controlled in magnitude and phase so that the first radiation pattern minima of both sum and difference patterns coincide.

8. A reception system for microwave navigation as in claim 1 comprising a local oscillator which is crystal controlled to stabilize its frequency so that the resulting intermediate frequencies are within the capture effect range of corresponding glide path and localizer receivers.

* * * * *